United States Patent [19]
Klein

[11] 3,923,723
[45] Dec. 2, 1975

[54] PROCESS FOR ENHANCING THE DISPERSION STABILITY OF NONAQUEOUS DISPERSIONS

[75] Inventor: Dieter Heinrich Klein, Midland, Mich.

[73] Assignee: The Dow Chemical Company, Midland, Mich.

[22] Filed: Apr. 24, 1972

[21] Appl. No.: 246,875

[52] U.S. Cl......... 260/33.6 UA; 260/34.2; 260/856; 260/859 R; 260/874; 260/876 R; 260/884; 260/885; 260/886
[51] Int. Cl.².. C08J 3/08; C08K 5/01; C08L 23/00; C08L 25/00
[58] Field of Search...... 260/34.2, 33.6 UA, 29.1 R, 260/78.3, 885, 886, 874, 901, 86.1 N, 80.3, 856, 884

[56] References Cited
UNITED STATES PATENTS

| | | | |
|---|---|---|---|
| 3,325,443 | 6/1967 | Christenson et al. | 260/41 R |
| 3,640,931 | 2/1972 | Clarke et al. | 260/34.2 |
| 3,652,472 | 3/1972 | Clarke et al. | 260/34.2 |
| 3,702,836 | 11/1972 | Walbridge | 260/29.1 R |
| 3,716,506 | 2/1973 | Simms et al. | 260/882 |
| 3,746,673 | 7/1973 | Simms et al. | 260/882 |
| 3,778,403 | 12/1973 | Walus | 260/34.2 |
| 3,779,977 | 12/1973 | Hicks | 260/33.6 UA |

*Primary Examiner*—Allan Lieberman
*Attorney, Agent, or Firm*—Ronald G. Brookens

[57] ABSTRACT

The formation of nonaqueous polymeric dispersions, solutions, hydrosols and colloidal suspensions by polymerizing vinyl monomers (I) in a hydrocarbon medium containing dissolved therein a stabilizing macromonomer component (II) comprising a polyester-aziridine derivative previously formed from poly-12-hydroxy stearic acid (IIA) and a compound (IIB) selected from the group consisting of compounds of the formula

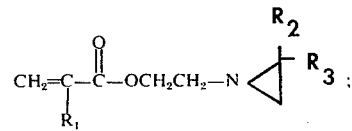

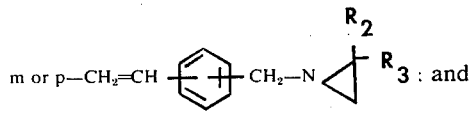

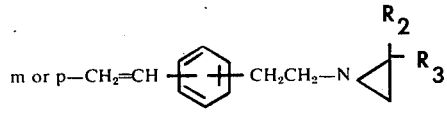

where
$R_1$ is hydrogen or $CH_3$,
$R_2$ is hydrogen or lower alkyl, and
$R_3$ is hydrogen or lower alkyl.

The above system produces a dispersion of a vinyl polymer (III) formed from the polymerized vinyl monomers (I) in the hydrocarbon medium wherein a modified stabilizer (IV) is formed either in situ from a macromonomer (II) or in a preliminary separate step by grafting a portion of the vinyl monomers (I) onto the soluble polymeric stabilizer backbone (II). It is possible to produce thermosetting emulsions of graft copolymers or lacquers of the graft copolymers. The stabilized vinyl copolymers thus resulting can be used for many coating purposes in view of their self-cross-linking and internal plasticization properties.

2 Claims, No Drawings

PROCESS FOR ENHANCING THE DISPERSION STABILITY OF NONAQUEOUS DISPERSIONS

BACKGROUND OF THE INVENTION

In the prior art, the process of preparing dispersions of vinyl polymers containing a dissolved polymeric stabilizing component is known. It is further known that polyester glycidyl methacrylate derivatives can be used as the dissolved stabilizer in hydrocarbon media (British Patent 1,123,611). It is also known that when vinyl monomers are polymerized to vinyl polymers in the presence of the dissolved polyester type stabilizers, some in situ grafting of vinyl monomers to the polyester-acrylate backbone will occur. From this knowledge, it is known how to use amphiphatic graft polymers either in the preformed state or as precursors with in situ grafting to yield stable dispersions of the insoluble vinyl polymers. In both cases the vinyl monomers are polymerized in the organic media which already contains the amphiphatic stabilizer either as precursor or as preformed graft copolymer. However, it is preferred to use the preformed stabilizer, since the stability of these compositions is generally improved over the precursor system. Theoretically, the explanation of the stability of vinyl compositions containing polyester graft copolymers is that the backbone of the dissolved polyester graft polymer remains dissolved in the hydrocarbon medium but the side chains being essentially vinyl polymers are not dissolved. These side chains are, however, miscible with the main vinyl polymers and, therefore, are able to disperse them in the hydrocarbon media.

SUMMARY OF THE INVENTION

This invention provides vinyl polymer compositions containing polyester aziridinyl graft copolymers as stabilizer wherein the compositions have significantly improved stability. Additionally, in their colloidal form, they show improved properties as coatings. These advantages are achieved by use of novel and determinative monomers (IIB) in the backbone of the stabilizer which monomers are selected from the group consisting of a compound corresponding to the formula

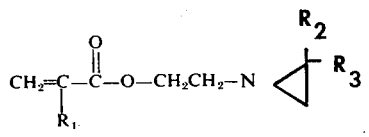

(such compounds are prepared by reaction of aziridinyl alcohols and methyl esters of acrylic or methacrylic acid); or a compound corresponding to the formula

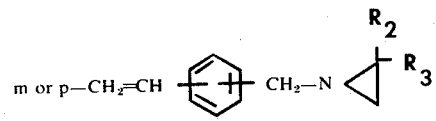

(such compounds are prepared by reaction of ar-vinylbenzyl chloride or bromide and an aziridine in the presence of excess aziridine and a base such as KOH); or a compound corresponding to the formula

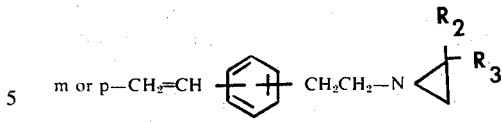

(such compounds are prepared by reaction of an aziridine and divinyl benzene). In the above formulas, $R_1$ is hydrogen or $CH_3$, $R_2$ is hydrogen or lower alkyl, e.g., 1 to 4 carbon atoms, and $R_3$ is hydrogen or lower alkyl, e.g., 1 to 4 carbon atoms. The mass ratio of (A) to (B) is from about 90 to 10 to about 80 to 20. Preferred compounds for (IIB) are those wherein $R_2$ is hydrogen and $R_3$ is methyl or ethyl. Especially preferred compounds are those wherein $R_2$ and $R_3$ are both hydrogen.

An important advantage of this invention is the ability to form higher molecular weight, more stable, and higher solids content dispersions by use of the dispersion polymerization technique. This is achieved by balancing the charges in the system. By use of the compounds designated IIB, the stabilizer backbone is basically charged. But by controlling the subsequently grafting composition, it is possible to produce a net stabilizer charge that is either basic or acidic. This charge is determined by the type of vinyl polymer desired as the coating composition per se. Thus, if a polyester precursor (backbone only containing the basic charge) is graft copolymerized with a mixture of vinyl monomers especially acrylates (methyl methacrylate or lauryl methacrylate as the vinyl polymer components) and a small amount of a monomer whose functional group is either proton donating, especially a copolymerizable carboxylic or hydroxylic monomer (acrylic acid, methacrylic acid, maleic anhydride itaconic acid, crotonic acid, fumaric acid), or proton accepting, especially a copolymerizable primary, secondary, or tertiary amine (2-dimethylaminoethyl methacrylamide, t-butylaminoethyl methacrylate, dimethylaminoethyl methacrylate, N-vinyl-2-pyrrolidone); a stable nonaqueous copolymer dispersion can be made. The critical proton donating or accepting monomer guarantees an amphiphatic balance and the functional group serves as an absorbent, reactant, or promotes association of the stabilizer onto the polymer particles. Alternatively, if a preformed stabilizer is used, then the backbone has already been reacted during the opening of the aziridinyl ring with either the proton donating or accepting monomer and the vinyl monomers may be as noted above with an additional basic or acidic monomer added to neutralize the stabilizer charge and promote dispersibility.

A start towards the understanding of electrical charges on particles suspended in hydrocarbons was made by van der Minne and Hermanie (J. I. van der Minne and P. H. J. Hermanie, J. Colloid Sci. 7, 600 (1952); 8 38 (1953)) who devised an effective electrophoresis cell and measured the electrical potential of charged carbon black particles in benzene. They demonstrated that dispersants give a charge, that the sign depends on the chemical nature of the dispersant. Further electrodeposition studies (made by F. M. Fowhes, F. W. Anderson and R. J. Moore; Shell Development Company Report P-1421), with carbon black suspended in hydrocarbon solutions of a wide variety of polymeric dispersants indicated that electric charges are generated on particles suspended in hydrocarbons by adidic or basic polar polymers or micelle forming substances. The charging process involves dissociation at the interface, donation of protons by acidic particles to basic dispersants (or by acidic dispersants to basic particles) and subsequent diffusion of the oil soluble ion beyond the plane of shear so that opposite charges result on the particle and in the liquid. The conclusion of this study was that the better dispersants are either micellar substances or oil or hydrocarbon soluble polymers having the ability to accept or donate protons. This concept has been utilized to prepare basic dispersants which can be used to prepare stable nonaqueous vinyl polymer dispersions in hydrocarbons.

From the previous art, it is clear that the charge concept has not been taught to prepare polyester stabilized nonaqueous dispersions. The previous art, e.g., teaches the reaction of glycidyl methacrylate with carboxyl terminated polyester, thus forming a macromonomeric polyester which does not contain proton accepting groups. It now is preferred to react a polymerizable aziridine compound with a carboxyl terminated polyester to form a mixture which at least contains 20% of a macromonomeric stabilizer monomer containing secondary amine groups which are capable to accept protons from acidic charged polymeric particles.

The acidic or basic nature of vinyl polymer particle surfaces influences very strongly the effectiveness of the stabilizer (dispersant) activity and thus affects the usefulness of the ultimate coating composition. The following table summarizes the effect on particle size and viscosity of an acidic dispersant versus a basic dispersant in a thermosetting copolymer dispersion.

THE EFFECT OF A BASIC VS. AN ACIDIC STABILIZER ON
DISPERSION VISCOSITY AND PARTICLE SIZE

| Type of Stabilizer | Dispersion Viscosity | Particle Size |
|---|---|---|
| Basic | 150 cps | 0.1 – 0.5 |
| Acidic | Thixotropic | >1.5 clusters |

The system studied in the preceding table is a nonaqueous dispersion containing a hydroxypropyl acrylate, ethyl acrylate, and methyl methacrylate copolymer as the "vinyl polymer." The commercial hydroxypropyl methacrylate and ethyl acrylate used contains acrylic acid as an impurity and, therefore, charges the copolymer particles acidic. Because like charges repel the effectiveness of the acidic dispersant to stabilize the acidic charged polymer particles was reduced, thus causing the thixotropic nature. In other words, basic dispersants are needed for acidic particles and vice versa.

Because it is possible and preferable now to incorporate arcylates in thermosetting vinyl polymer-type coating compositions, dispersions can be so designed that the polymer forms a continuous film at room temperature of improved properties. By reducing the amount of methacrylates and by increasing the amount of acrylates (acrylates are better plasticizers) of the vinyl polymer composition to be dispersion polymerized, film forming polymers at room temperature can be designed, e.g., a copolymer consisting of hydroxy ethyl methacrylate, methyl methacrylate and butyl methacrylate at a ratio of 10:30:60 in a thermosetting dispersion does not form a film at room temperature. However, a 10:30:60 hydroxy ethyl acrylate, methyl methacrylate/ethyl acrylate composition will form a nonaqueous dispersion where the discontinuous phase is a liquid and will form a clear and continuous as well as a flexible and tack-free film at room temperature.

The compounds, herein referred to as (IIB) are essential in the stabilizer backbone. These compounds are highly reactive and can be polymerized by free radical methods through the vinyl group, or by ionic methods through the aziridine ring.

Previously used monomers in the stabilizer for vinyl compositions contained only an unsaturated vinyl group. The compounds (IIB) of this invention are considerably more reactive than the previously used monomers and can be ionically polymerized by addition of small amounts of acid or other proton donor. Thus, the polymers formed by use of this reactive monomer are of higher molecular weight than prior polymers. By reason of the increased number of reactive sites, it is available for cross-linking and thus assists in avoiding the necessity of adding an external cross-linking agent to the total composition.

The preparation of the instant dispersion stabilizers is illustrated by the following reaction sequence:

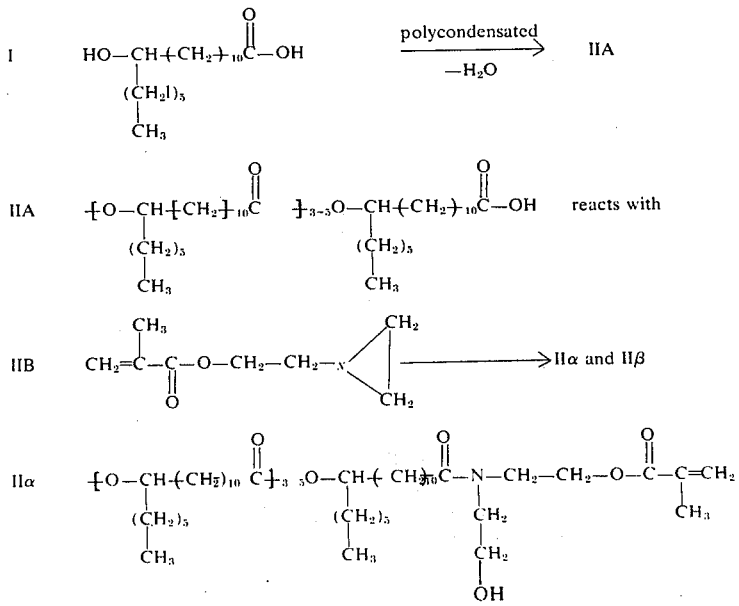

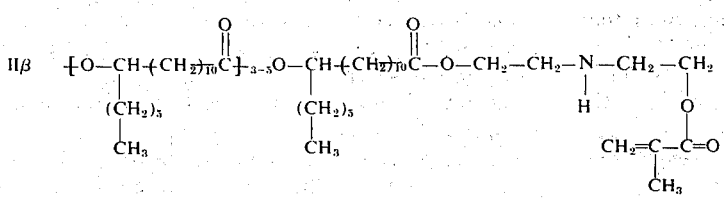

Structure I (12-OH-stearic acid) is oligomerised to structure IIA. The carboxyl end groups then react with the aziridinyl group of IIB to form the corresponding ester and/or amide, IIα and/or IIβ which are oligomeric monomers which are soluble in monofunctional hydrocarbon solvents.

If the above reaction is carried out at temperatures below 50°C. the mole ratio of IIα to IIβ is about 80:20. At temperatures above about 110°C. the mole ratio of IIα to IIβ is about 90:10. IIα. Increasing the reaction temperature favors the formation of structure IIα.

The presence of structure IIβ is advantageous since the secondary amine group functions as a hydrogen chloride scavenger and helps to stabilize the vinylidene chloride polymers.

Structure I is a polymeric substance of average molecular weight 300 to 3000. The preferred average molecular weight of the polyester is from about 1200 to about 1700.

The preferred method of preparation is to use the macromonomer II with side chains already grafted thereon (this is what is termed preformed graft stabilizer IV). In this case, by way of illustration a monomer composition of methyl methacrylate, lauryl methacrylate and 2-(1-aziridinyl)ethyl methacrylate (IIA) or N-(plvinylbenzyl) aziridine (IIB) at a ratio of 58:40:2 is grafted in solution form onto (II).

It is also possible to add the macromonomer (II) to the hydrocarbon which is used for the dispersion polymerization so that (II) is present in the seed stage and in this stage graft copolymer is formed in situ between II and polymerizing monomer. Either way the coating composition is formed by dispersion polymerization in the presence of said stabilizer and by balancing the charges on the stabilizer and vinyl polymer, a stable improved coating composition results.

DESCRIPTION OF THE PREFERRED EMBODIMENTS

The vinyl compositions containing new amphiphatic stabilizers are produced by either the formation of a preformed stabilizer which is present during vinyl polymerization, or by use of a macromonomer which is present during vinyl polymerization to simultaneously produce vinyl graft copolymer stabilizer.

Since the monomers used to form the various components of the compositions are similar, they will be designated as follows for purposes of this invention:

I. vinyl monomers used to form the insoluble vinyl polymer;
II. macromonomer used as the soluble backbone of the stabilizer;
III. the insoluble vinyl polymer resulting from polymerization of (I);
IV. the partially soluble polyester graft copolymer resulting from grafting part of (II) onto a mixture of methyl methacrylate/lauryl methacrylate and IIB.

The term "vinyl" monomer as herein used especially regarding (I) and as used in the art, includes ethylenically unsaturated monomers which, though not of vinyl structure in the strict sense, polymerize according to the vinyl polymerization mechanism, for example, monomers which are vinylidene or ethylenic monomers but which are polymerized in the vinyl manner, as well as double unsaturated monomers such as butadiene, are within the term. Particularly preferred monomers I are acrylic acid, acrylates and methacrylates of alkanols or glycols, preferably with 1–22 carbon atoms, e.g., methyl acrylate, ethyl acrylate, butyl acrylate, methyl methacrylate, butyl methacrylate; hydroxy acrylates and methacrylates of alkanes or alkanols with 1–22 carbon atoms, e.g., hydroxyethyl or propyl methacrylate or hydroxybutyl acrylate. Other monomers include lower alkyl acetates, styrene, tertiary butyl styrene, chloro styrene, vinyl chloride, acrylonitrile, vinyl acetate, vinyl proprionate, acrylamides, vinylidene chloride; and optionally the compounds (IIB) above can be used as well as methylol acrylamide and tri-lower-alkyl amine methacrylamides, e.g., trimethylamine-, 1,1-dimethyl-1(2-hydroxypropyl)amine, and 1,1-dimethyl 1-(2,3-dihydroxypropyl)amine methacrylimides. Mixtures of these are preferred and in such mixtures the proportions will vary considerably with the intended use.

The component II is formed from IIA and IIB. II is a macromonomer, solvatable in nontoxic hydrocarbon media. To form such a component compound IIa must be reacted with IIB. The solvatable compound II contains the compounds IIB in quantities of 10–20 weight %. II should further comprise at least about 80% of a polyester such as 12-hydroxy stearic acid or condensation products of fatty difunctional acids and diols such as 1,12-decandiol with sebacic acid to form a polyester compound which is solvatable in aliphatic hydrocarbons.

The component III is, of course, the polymer or copolymer formed from monomers I. This component can be present in coating compositions at up to about 80% solids. Generally, further increased solids make the composition too highly viscous, but stability will improve at high solids. Component III is preferably a random copolymer as noted above. One preferred polymer comprises 15–20 methyl acrylate, 85–80% vinylidene chloride, 0–5% proton donor or acceptor. Another preferred composition contains 15% hydroxyethyl acrylate, 35% ethyl acrylate, 45% styrene and 5% acrylonitrile. The hydroxy substituted and other optional monomers can be eliminated but in this invention an advantage is that the hydroxy substituted monomer can be used without undesirably modifying the stability of the polymer because of the basic charges achieved in II via use of IIB. In prior art compositions, it was necessary to exclude carboxyl monomers in order to get workable nonaqueous compositions. Furthermore, carboxy containing monomers are often preferred in this invention. By inclusion thereof in I of this invention, it is now possible to cross-link, via the carboxy group, both the backbone II and at the side chains of IV. The N—H in the ring-opened aziridinyl group serves as a cross-linking site and some cross-linkage is thus achieved with the carboxy group. However, if hydroxy groups are present, it may be necessary to add cross-linking agents. Satisfactory agents include resins of high hydrocarbon tolerance in the range of 50–200 such as butylated melamine-formaldehyde, urea-formaldehyde resins, or polymers containing isocyanate or blocked isocyanate groups. This gives internal strength, toughness, and flexibility to the coating. As noted above in the choice of monomers I for use in dispersion systems, it is possible to pick monomers to give the vinyl polymer particles an acidic or basic charge and achieve the right balance of charges.

IV is, of course, backbone II with random copolymer segments such as methyl methacrylate, lauryl methacrylate and IIB grafted at the grafting sites on compound II.

It is possible to make thermosetting compositions by decreasing the relative amount of side chains or it is possible to make lesser molecular weight compositions suitable for use as lacquers, by increasing that amount. II and IV comprise preferably, 1–25% of total solids in the coating compositions. In the use of II and IV, the individual components are, for II preferably 10–20 parts IIB per 80–90 parts IIA, and for side chains preferably 0–58 parts methyl methacrylate (or methyl acrylate) for about 40–98 parts lauryl methacrylate (or lauryl acrylate) and about 2–30 parts proton donor, e.g., methacrylic acid, fumaric acid, crotonic acid, acrylic acid, maleic anhydride and/or maleic acid, itaconic acid and/or itaconic anhydride or 2–100 parts of proton acceptor IIB, 2-dimethyl aminoethyl methacrylamide, t-butyl aminoethyl methacrylate dimethyl aminoethyl methacrylate, N-vinyl-2-pyrrolidone.

In choosing the amount of proton donor the ratio of soluble to insoluble monomers in the side chain composition is determinative; thus, a proton donor is used at about 5–30% by weight of the side chain composition and when little or no insoluble monomer (e.g., MMA) is used a maximum (20–30%) proton donor is used. However, if a proton acceptor is used, there is no limit on the proportion and the side chain can be 100% of such monomer.

In the dispersion polymerization, nontoxic solvents can be used which is an added advantage in view of anti-pollution laws. Such solvents are those nontoxic solvents which boil at 50°–300°C.

This invention is adapted to produce colloids (organic systems), solutions, lacquers and dispersions via the nonaqueous dispersion route. The nonaqueous dispersion (NAD) resulting can be used, per se, or added improvements can be achieved by using colloidal systems. To form such systems, the technique involves removing the solvent used in the dispersion polymerization to form about 70% solids. After stripping solvent, a coupling solvent is added; this is defined as a solvent or mixture thereof which is compatible with both the polymer III and the solvent to be added to make a colloid. Examples are given hereinafter. This addition is made to form about 50–60% solids III in the system.

In all such uses the stabilizer II and/or IV is inherently associated with polymer III but is present at low weight percents and serves in ultimate use as a stabilizer for the coating composition only when the dispersion is used, per se. In the colloidal systems, its function is reduced by the coupling solvent. However, in all appropriate systems, it serves as a self-cross-linking agent and internal plasticizer.

As noted above, the nonaqueous dispersion technique (NAD) is also used to make solution polymers and colloids. The NAD technique uses nontoxic hydrocarbon diluents in which the monomers are polymerized, forming large polymer particles of high molecular weight.

The conversion from monomer to polymer in nonaqueous dispersion polymerization takes place more rapidly than in solution polymerization; namely, five hours versus ten hours.

By post addition of polar solvents the particles break down to smaller particles and a colloid can be formed.

The total diluent composition should contain at least 65–90% poorly hydrogen bonded, 0–35% strongly hydrogen bonded and/or moderately hydrogen bonded solvents. Some of the solvents which may be used in this invention are summarized on the following table:

| SOLVENT | SOLUBILITY PARAMETER γ | HYDROGEN BONDING INDEX | CLASSIFICATION |
|---|---|---|---|
| Hexane | 7.3 | 2.1 | |
| Isopar E (Isooctane) | 7.1 | 2.5 | |
| VM&P Naphtha | 7.6 | 2.5 | Poorly Hydrogen Bonded |
| High boiling aromatics | 8.5 | 2.5 | |
| Toluene | 8.9 | 3.3 | |
| Xylene | 8.8 | 3.5 | |
| Ethyl | 9.1 | 5.2 | |
| Methyl Ethyl Ketone | 9.3 | 5.4 | |
| Acetone | 10.0 | 5.9 | Moderately Hydrogen Bonded |
| Isopropyl acetate | 8.4 | 6.0 | |
| Ethylene glycol ether acetate | 8.7 | 6.5 | |
| Diacetone alcohol | 9.2 | 6.8 | |
| Ethylene glycol butyl ether | 8.9 | 7.0 | |
| Ethanol | 12.7 | 8.5 | |
| Butanol (iso) | 10.5 | 8.5 | Strongly Hydrogen Bonded |
| Butanol (n) | 11.4 | 8.5 | |
| Isopropanol | 11.5 | 8.7 | |
| $H_2O$ | None | >9.0 | |

Hydrogen bonding indexes are assigned arbitrarily and as can be seen on the preceding table may be used to classify solvents into three groups: poorly, moderately and strongly hydrogen bonded.

However, the diluent composition for colloids should be chosen so as to meet air pollution law legislations, e.g., not more than 20% toluene or 8% xylene or 20% diisobutyl ketone, etc.

To increase the plasticization (e.g., where large amounts of nonfatty acrylates are used) external compatible plasticizers conventional in such systems can be added. Preferred plasticizers are esters of phthalic acid, e.g., cyclohexyl butyl ester, dicyclohexyl ester, or benzylhexyl ester.

Other cross-link agents may be methylol acrylamide, methylol methacrylamide, and amine imide monomers as already mentioned above.

Furthermore, it is recommended that IIB can be used as self-cross-linking agents. Other monomers to be used are already described above which can avoid addition of external cross-linkers.

The invention is best understood by reference to the following illustrative examples:

EXAMPLE I

Preparation of macromonomeric precursor

900 Grams of a carboxyl terminated poly-12-hydroxy stearic acid was reacted with 79 grams of 2-(1-aziridinyl)ethyl methacrylate or N-(ar-vinylbenzyl) aziridine in the presence of 765 grams isooctane at 45°C. for two days. The 2-(1-aziridinyl)ethyl methacrylate or N-(ar-vinylbenzyl)aziridine was used to introduce a polymerizable double bond and proton accepting charges (herein also referred to as IIB).

EXAMPLE II

Preparation of preformed graft copolymer

```
1280.0  Backbone Polymer Solution,
        described in Example I
 526.0  Butylacetate
 153.0  Methyl methacrylate
 108.0  Lauryl methacrylate
   3.0  IIB
   5.4  α(t-butylazo)isobutyl nitrile
```

All the ingredients were charged and heated to 90°C. and maintained at 90°C. until conversion was complete. The polymer then was diluted to 35% solids in isooctane.

The macromonomer II under Example I contains an unsaturated side chain upon which a monomer composition IIB of methyl methacrylate, lauryl methacrylate and either 2-(1-aziridinyl)ethyl methacrylate or N-(ar-vinylbenzyl) aziridine at a ratio of 58:40:2 was grafted in solution form. This example represents a procedure of making a basic dispersant. If IIB is substituted with acrylic acid or methacrylic acid for the graft copolymerization, an acidic stabilizer can be formed.

EXAMPLE III

Preparation of a thermosetting nonaqueous dispersion

A nonaqueous dispersion of a copolymer is obtained by the emulsion copolymerization at 82°C. of 210 parts of hydroxypropyl acrylate, 560 parts of methyl methacrylate, and 630 parts of ethyl acrylate in 750 parts of hexane and 518 parts of isooctane (Isopar E) in the presence of 294 parts of the preformed graft polymer solutions of Example II, 3 parts of n-octyl mercaptan and 3 parts of azobis-isobutyronitrile.

The dispersion has a nonvolatile content of 50.0% and viscosity is 90 centipoise.

When cast on a glass plate, a continuous film forms as soon as the diluent evaporates. The dry film is tough and flexible. If a highly butylated melamine-formaldehyde condensate or a mixture of 4,4'-and 4,2'-oxydiphenyldiisocyanate, is added, the film may be cross-linked at elevated temperatures or at room temperature.

EXAMPLE IV

Preparation of a thermosetting nonaqueous styrene copolymer dispersion

A nonaqueous dispersion of a copolymer was obtained by the dispersion polymerization at 90°C. of 210 parts of hydroxy ethyl acrylate, 700 parts of styrene, 420 parts of ethyl acrylate and 70 parts of acrylonitrile in 300 parts of hexane and 1400 parts of isooctane in the presence of 200 grams of the macromonomeric precursor of Example I, and 3 parts of azobisisobutyronitrile.

The dispersion had a viscosity of 120 cp (centipoise). When diluted down to 40 percent solids with n-butanol and cast on a glass plate, the dispersion formed a continuous film as soon as the diluent evaporated. If a highly butylated melamine-formaldehyde condensate is added, the film may be cross-linked at elevated temperatures.

EXAMPLE V

| X | /Methyl methacrylate/Ethyl acrylate | |
|---|---|---|
| 10.0 | 35.0 | 55.0 | where X may be trimethylamine methacrylimide; 1,1-dimethyl-1-(2-hydroxypropyl) amine methacrylimide; or 1,1-dimethyl-1-(2,3-dihydroxypropyl) amine methacrylimide.

The above monomers provide improved dispersion stability and the polymers are self-cross-linkable. Coatings with improved adhesion, toughness, and wettability are obtained by incorporating any of such monomers.

Baking schedule for this type of thermosetting nonaqueous dispersion is above 250°F. Because tertiary isocyanate groups are generated, strong catalysts must be used for cross-linking these with hydroxyl reactivity. Mercury solution (such as, e.g., Curithane 252 from Upjohn) has proven to be the best thermolysis catalyst for these systems.

Of particular significance is the monomer 1,1-dimethyl-1-(2-hydroxypropyl) amine methacrylimide (DHA). DHA is soluble in polar solvents such as ethanol, isopropanol, chloroform and water; slightly soluble in benzene, ethyl acetate and acetone; and insoluble in carbon tetrachloride, hexane, and isooctane (Isopar E).

Because DHA is a very polar monomer and hence insoluble in hydrocarbon media, it will decrease also the solubility of a copolymer in hydrocarbons. In hydrocarbon media, polar molecules will have highest reactivity and this holds for chain transfer agents and initiators as well as monomers. Polymerization in hydrocarbons and with DHA as a comonomer increases speed of reaction so that little solution polymerization can take place. The less solution polymerization takes place, the finer will be the polymer particles and hence the dispersion will be more stable and of lower viscosity.

Furthermore it has a negative as well as a positive charge, therefore allowing better adsorption, association, or absorption of the stabilizer onto the polymer particles, which contain DHA. This may be a further reason why nonaqueous dispersions are more stable when they contain DHA.

The use of DHA makes the incorporation of monomers possible, which normally would result in low stability of the dispersion. Monomers such as styrene, butyl acrylate, and 2-ethylhexyl acrylate can be copolymerized at higher amounts if the copolymer contains at least 5% DHA. The amount of DHA is not limited and a homopolymer of DHA also can be made in hydrocarbon media.

EXAMPLE VI

| Methylol acrylamide/acrylonitrile/ethylacrylate | | |
|---|---|---|
| 7.5 | 25.0 | 67.5 |

This is an additional example of a self-cross-linking nonaqueous dispersion. When a film was cast and baked at 250°F. for 30 minutes, the methylol groups react amongst each other.

a. Preparation of methylol acrylamide:

| FORMULA | |
|---|---|
| 355 g | Acrylamide |
| 825 g | Formaldehyde solution (40% in n-butanol) |
| 7.9 g | Dimethylethanolamine or triethylamine |

The components of the formula were mixed together and heated to 90°C. under efficient agitation for 30–60 minutes. The product was cooled and filtered.

The process of making methylol acrylamide is necessary to give stable compositions.

The composition is then made as set forth in Example IV.

Examples VI and VII demonstrate that the technique of nonaqueous dispersion polymerization may be applied also for pressurized polymerizations.

EXAMPLE VII

A 400 cc citrate bottle was loaded as follows:
125 Grams vinylidene chloride, 25 grams methyl acrylate, 37 grams isooctane, 6 grams of macromonomeric precursor of Example I at 50 percent solids and 0.45 grams of azobisisobutyronitrile. The bottle was capped and put in a rotating tumbler containing water having a temperature of 65°C. After 12 hours the bottle was removed and cooled. The resulting product was a stable dispersion of 80 percent solids. The average particle size of the dispersion was 0.1937 micron. The product viscosity of the dispersion at 80 percent solids was roughly 140 cp (centipoise).

EXAMPLE VIII

A 400 cc citrate bottle was loaded as follows: 60 Grams vinylidene chloride, 20 grams vinylchloride, 16.5 grams methyl acrylate, 3.5 grams hydroxypropyl acrylate, 25 grams VM&P naphtha, 4 grams of macromonomeric precursor of Example I and 0.5 gram of azobisisobutyronitrile. The bottle was capped and put in a rotating tumbler containing water having a temperature of 65°C. After 12 hours the bottle was removed and cooled. The resulting product was a stable dispersion at 78.0 percent solids.

EXAMPLE IX

A solution at 35 percent of a mixture of 4,4'-and 4,2'-oxydiphenyldiisocyanate in VM&P naphtha was prepared. 100 Grams of the dispersion under Example VIII at 78 percent solids was mixed with 23 grams of the above-described isocyanate mixture. The mixture was cast on glass panels and the wet films allowed to dry at 250°F. for 30 minutes. The resulting dry films had a high gloss and clarity. Tensile strength of the cross-linked film was in the order of 6000 psi and elongation at break was approximately 11%.

The isocyanate modified dispersion may also be applied for room temperature cured coatings where the residual isocyanate groups react with humidity in the air.

The following examples illustrate that the process of nonaqueous dispersion can also be used to prepare solution or colloidal polymers:

EXAMPLE X

Preparation of thermosetting colloids

The preparation of a colloidal resin involves three steps:

1. Preparation of a macromonomeric stabilizer (Example I).
2. Preparation of a NAD with, e.g., the following monomers: HPA/S/BA/VCN of proportions of 10/50/37/3
3. A portion of the diluent of the NAD is stripped off and substituted with a mixture of n-butanol and toluene.

The example below describes the preparation of the colloids in detail.

A nonaqueous dispersion of a copolymer is obtained by the dispersion copolymerization at 90°C. of 42 parts of acrylonitrile (VCN), 140 parts of hydroxypropyl acrylate (HPA), 700 parts of styrene (S), 518 parts of butyl acrylate (BA), 750 parts of hexane and 518 parts of isooctane (Isopar E) in the presence of 95 parts of the macromonomeric stabilizer of Example I, 17 parts of n-octyl mercaptan and 8 parts of azobisisobutyronitrile.

Of the dispersion above, 760 parts of diluent is stripped off at 100°C. bath temperature. Then at 100° bath temperature, a mixture of n-butanol and toluene is added. The final solvent and/or diluent composition should have the following summarized composition:

| Hydrocarbon mixture/n-butanol/toluene | | |
|---|---|---|
| 45 | 35–40 | 15–20 |

The hydrocarbon mixture is a mixture of hexane and isooctane which was left in the dispersion polymer. The solvent mixture is chosen to meet air pollution law legislations.

The colloidal polymer has a solids content of 55% and the product viscosity should not be higher than z.

EXAMPLE XI

A 400 cc citrate bottle was loaded as follows: 115 Grams vinylidene chloride, 11 grams hydroxypropyl acrylate, 24 grams methyl acrylate, 37 grams VM&P naphtha, 4 grams of stabilizer monomer solution (Example I) and 0.5 gram of azobisisobutyronitrile. The bottle was capped and put in a rotating tumbler containing water having a temperature of 65°C. After 12 hours the bottle was removed and cooled. The product was then dissolved in 150 grams methyl ethyl ketone. The slightly turbid solution polymer formed a film at room temperature which can be cross-linked with a wide variety of melamine resins and isocyanates.

What is claimed is:

1. A process for enhancing the dispersion stability of nonaqueous dispersions, said process comprising dispersing in a nonpolar hydrocarbon diluent a polymeric composition consisting essentially of (I) a side chain, insoluble in said diluent, which side chain is a polymer of a mixture of at least one ethylenically unsaturated monomer which contains a proton donor or proton acceptor group with minor amounts of a monomer selected from the group consisting of trimethylamine methacrylamide; 1,1-dimethyl-1-(2-hydroxypropyl) amine methacrylimide; 1,1-dimethyl-1-(2,3-dihydroxypropyl) amine methacrylimide; methylol acrylamide, and methylol methacrylamide said side chain being present in an amount equal to about 10 to 65 percent of total dispersion volume and (II) a backbone soluble in organic media, comprising a stabilizer which is the product of the reaction of (IIA) a poly-12-hydroxy stearic acid having a molecular weight up to about 3000 and (IIB) a compound selected from the group consisting of compounds of the formula

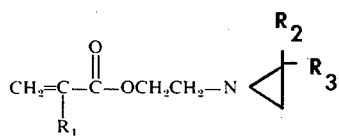

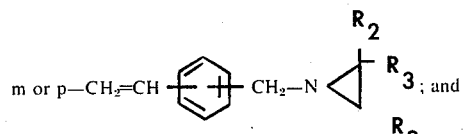

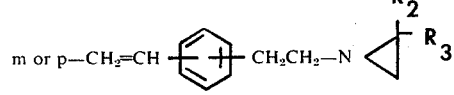

where
$R_1$ is hydrogen or $CH_3$,
$R_2$ is hydrogen or lower alkyl, and
$R_3$ is hydrogen or lower alkyl; and wherein the mass ratio of (IIA) to (IIB) is from about 90:10 to about 80:20 said stabilizer being present in an amount of from about 1 to 10 percent by weight of (I).

2. The process of claim 1 wherein (I) is the polymerizate of at least one monomer selected from the group consisting of styrene, butyl acrylate and 2-ethylhexyl acrylate in combination with at least about 5 percent by weight of the monomer 1,1-dimethyl-1-(2-hydroxypropyl) amine methacrylimide.

* * * * *

UNITED STATES PATENT OFFICE
CERTIFICATE OF CORRECTION

Patent No. 3,923,723  Dated December 2, 1975

Inventor(s) Dieter Heinrich Klein

It is certified that error appears in the above-identified patent and that said Letters Patent are hereby corrected as shown below:

The term of this patent subsequent to

December 24, 1991, has been disclaimed.

Signed and Sealed this

Twenty-seventh Day of July 1976

[SEAL]

Attest:

RUTH C. MASON
*Attesting Officer*

C. MARSHALL DANN
*Commissioner of Patents and Trademarks*